Figure 1:
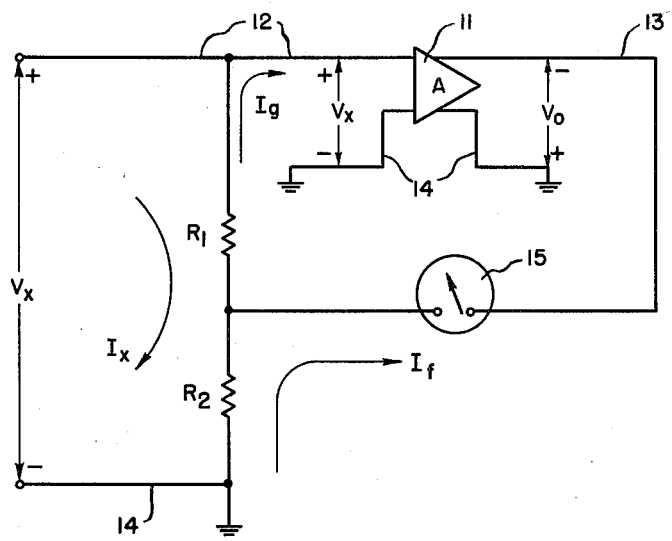

June 13, 1961   J. R. GARDNER   2,988,699
LINEAR D.C. MICROMICROAMMETER
Filed April 9, 1958

INVENTOR.
JACK R. GARDNER
BY
ATTORNEY

United States Patent Office 2,988,699
Patented June 13, 1961

2,988,699
LINEAR D.C. MICROMICROAMMETER
Jack R. Gardner, Fort Worth, Tex., assignor to General Dynamics Corporation, San Diego, Calif., a corporation of Delaware
Filed Apr. 9, 1958, Ser. No. 727,382
2 Claims. (Cl. 324—117)

The present invention is a linear D.C. micromicroammeter, and more particularly a D.C. micromicroammeter which uses an amplifier and negative feedback without requiring any D.C. to A.C. conversion process.

Generally, direct current linear micromicroampere meausring instruments use an amplifier to increase the signal which is to be measured in order that conventional current measuring or indicating apparatus can detect it. Employing negative feedback around the amplifier so used is a conventional technique that makes the relationship between the output and input of the amplifier substantially independent of variations in the gain of the amplifier itself. This makes the output of the amplifier a linear function of the input to the amplifier.

Formerly, the D.C. amplification of small D.C. signals has been very difficult to achieve. It has been much easier to convert small D.C. signals into small A.C. signals and then use an A.C. amplifier to increase the A.C. signal. This is the method generally used in former D.C. micromicroammeters. The D.C. input signal is converted to an A.C. signal and then amplified by an A.C. amplifier. The resulting relatively large A.C. signal is then measured by conventional means.

This approach, however, while obviating the difficult D.C. amplification, has serious disadvantages. In order to convert the small D.C. input signal to an A.C. signal, former instruments use an input stage of either an electromechanical chopper or a vibrating reed condenser. When an electromechanical chopper is used the sensitivity of the instrument is limited by the electrical noise produced by the chopper contacts. Also, because the input resistor must be low to minimize chopper noise, the A.C. amplifier gain must be high, requiring a plurality of space taking stages of amplification.

The vibrating reed condenser type of instrument is inherently inefficient in the D.C. to A.C. conversion process. The conversion process in this type of instrument also introduces an undesirably long time constant, causing the instrument to have a slow response time.

In addition, both of these types of conversion mechanisms require periodic adjustment or replacement and are a major source of trouble and maintenance expense.

The present invention solves the problem of very small signal D.C. amplification which, until now, has been generally avoided by instrument manufacturers. As a result, none of the disadvantages of former micromicroammeters which are attributable to the D.C. to A.C. conversion process are found in the present instrument. The present invention eliminates the chopper noise and poor sensitivity characteristic of the electromechanical chopper type instruments without introducing the slow time constant inherent in the vibrating condenser type instruments. The time response of this instrument is considerably less than, and overall reliability is considerably greater than, that of former instruments.

It is, therefore, an object of this invention to provide a D.C. linear micromicroammeter which has a faster response time and which is more sensitive than former instruments.

Another object is to provide a D.C. linear micromicroammeter that is more reliable than former instruments.

Another object is to provide a D.C. linear micromicroammeter that amplifies very small D.C. signals without utilizing D.C. to A.C. conversion processes and thus is free of the many disadvantages inherent therein.

Figure 2:
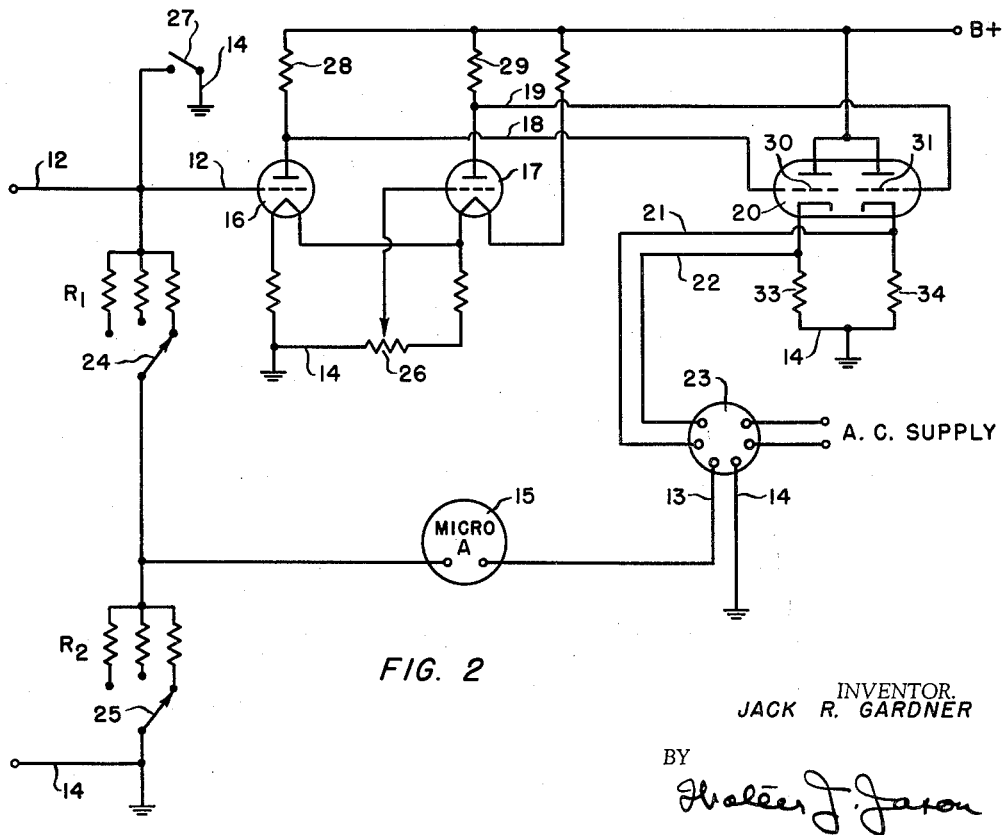

Other objects and features of the present invention will be readily apparent to those skilled in the art from the following specification and appended drawings wherein is illustrated a preferred form of the invention, and in which:

FIGURE 1 is a simple schematic which is an aid in the explanation of the operation of the invention, and FIGURE 2 is a detailed schematic of the present invention.

Referring now to FIGURE 1, an amplifier 11 is shown which has an input lead 12, output lead 13, and common lead 14. A D.C. current indicator 15 has one terminal connected to the output lead 13 and the other terminal connected to electrical circuits leading to the input lead 12 and common lead 14. A first resistor $R_1$ is connected between the input lead and the current indicator, while a second resistor $R_2$ is connected between the current indicator and the common lead 14. The resistor $R_1$ has a much higher impedance than the resistor $R_2$.

To measure a very small D.C. current, in the order of micromicroamperes, the input lead and common lead are connected with the current carrying circuit so that $R_1$ and $R_2$ are in series in the circuit. The unknown current which is to be determined is designated $I_x$ in FIGURE 1. The current $I_x$ produces a voltage potential $$V_x = I_x(R_1 + R_2)$$

between the input lead and the common lead. This is the input voltage to the D.C. amplifier. The amplifier output voltage $V_0$ is opposite in polarity to the input voltage $V_x$ and produces a current $I_f$. This current drives the input voltage toward zero until an equilibrium condition $I_xR_1 = I_fR_2$ is reached. Then the amplifier sees only an input voltage of $I_xR_2$, which is just enough to maintain the current $I_f$.

A detailed analysis of the operation can be made by writing conventional loop current equations. The current $I_g$ (grid current) is negligible. Keeping this in mind, plus the fact that $R_1$ is very much greater than $R_2$, and the amplifier gain A is much larger than 1, the relation $I_xR_1 = I_fR_2$ can be derived from the following equations:

(1) $V_x = I_x(R_1 + R_2) - I_fR_2$
(2) $V_0 = I_fR_2 - I_xR_2$
(3) $V_0 = AV_x \ldots$ Writing the relation as $$I_x = I_f \frac{R_2}{R_1}$$

makes it clear that the current $I_f$, the current which passes through the current indicator, is much larger than the input current $I_x$. Thus a very small input current $I_x$ can be determined by the use of a conventional current indicator that could not measure $I_x$ directly and a knowledge of the ratio $R_2/R_1$.

If the schematic shown in FIGURE 1 were used to illustrate former instruments then it would show, at the very least, a D.C. to A.C. converter and an A.C. amplifier. The fact that former instruments used this method in spite of the many disadvantages inherent therein points up the inventive stride existent in the present instrument.

FIGURE 2 is a detailed schematic of a preferred embodiment of the present invention. The D.C. amplifier has an input stage containing two electrometer tubes 16 and 17. Electrometer tubes have unusually low values of grid current and thus present a very high impedance to a D.C. current. The tubes 16 and 17 are VX55A electrometer tubes but other electrometer tubes could be used if desired. The two tubes are connected in a balanced bridge arrangement with the voltage output of the bridge appearing as a difference in voltage between leads 18 and 19.

The input stage is followed by a balanced bridge cathode follower stage which has a low output impedance. The low output impedance is a characteristic of cathode output or cathode follower stages. The tube 20 in the cathode follower stage is a 12AU7 which has, essentially, two tubes within one envelope. There are, however, many other tubes suitable for use in such a circuit. The output of the cathode follower stage appears as a voltage difference between the leads 21 and 22.

This particular combination of balanced bridge electrometer tube input stage and balanced bridge cathode follower stage converts a low D.C. input signal into a relatively high voltage, high current output signal. The elimination of the D.C. to A.C. converter reduces the overall time response of the instrument, and the effect of the electrometer and cathode follower stages makes it possible to use some type of chopper stabilized D.C. amplifier as a third stage, if desired, without an adverse signal-to-noise ratio. The preferred embodiment, however, uses a push-pull magnetic amplifier 23 as a third stage. The preferred magnetic amplifier actually used is a Ferrac M-1057 available from Airpax Products Company, Inc. of Baltimore, Maryland. The magnetic amplifier receives a D.C. current input from the cathode follower stage and produces a D.C. voltage output on lead 13. A "push-pull" mag. amp. is one which produces a positive D.C. output voltage as a result of a D.C. input current of one polarity, and a negative D.C. output voltage as a result of a D.C. input current of opposite polarity. There is a type of push-pull mag. amp. which produces an A.C. output voltage the phase of which depends on input current polarity, but "push-pull mag. amp." as used herein does not refer thereto. All mag. amps., however, require an A.C. power supply and the mag. amp. in FIGURE 2 is shown with terminals for such a power supply. The current indicator 15 shown in FIGURE 2 is a conventional d'Arsonval type microammeter, but other current indicating devices may be used. No stationary or bulky wall type galvanometers are needed however, and these types are not conventionally used except in precision laboratories. Currents of either polarity can be measured by using a zero-center meter or by installing a double-pole double-throw reversing switch in the circuit.

For accurate results the resistors $R_1$ and $R_2$ shown in FIGURE 2 should be precision resistors. The resistors $R_2$ should preferably have values in the order of a few hundred ohms but they may have values over a range of about 20 to 20,000 ohms. The resistors $R_1$ should preferably have values in the order of megohms but as long as $R_1$ is greater than or equal to $100 \times R_2$ then the error introduced by using the approximate equation $$I_x = I_f \frac{R_2}{R_1}$$

will be less than 2% for the worst condition, and in general it will be considerably less than that. A more precise relation $$I_x = \frac{I_f R_2 (1 - 1/A)}{R_1 + R_2 (1 - 1/A)}$$

can be used if desired, but for normal applications it will never be necessary. This more precise relation can be derived from the Equations 1, 2 and 3 previously set forth, keeping in mind the fact that "A" is actually a negative quantity. The plurality of resistors, or variable resistors, $R_2$ and $R_1$ set the range of the instrument. The range is varied by changing the values of resistance in the circuit. The resistor switches 24 and 25 shown in the schematic are "make before break" switches to prevent even a momentary loss of continuity in the resistor network. "Break before make" switches might cause transients which would have an adverse effect on amplifier stability and zero drift.

A zeroing potentiometer 26 and a shorting switch 27 are used to zero the instrument, that is, set the current indicator at zero when there is no input signal. By closing switch 27 the input grid or lead 12 is connected to the common lead 14 so there can be no input signal. The potentiometer 26 is then adjusted until no current is indicated by the meter 15. To prevent zero "drift," the electrometer tubes used in the instrument should be aged, that is, operated for a while. The length of time required for this may vary with the type of electrometer tube used. The directly heated cathodes of the two electrometer tubes are connected in series so that the two tubes will have the same relative heater voltages. Tube 17 is selected to have the same drift characteristics as tube 16, and is physically located to be exposed to the same environmental conditions so that any drift in tube 16 is cancelled out by the drift in tube 17. After the tubes are aged there should be substantially no zero drift after the instrument has been turned on and allowed to warm up. Thus, once the shorting switch and zeroing potentiometer have been used to zero the current indicator 15, its zero point should remain substantially the same. The effect of adjusting the zeroing potentiometer may be more clearly understood from an explanation of the operation of the D.C. amplifier.

A regulated D.C. power supply, indicated by B+ in FIGURE 2, supplies the plate voltage for the two electrometer tubes 16 and 17 through equal plate resistors 28 and 29. If the switch 27 is open, a small positive D.C. signal applied to the input lead 12 causes the grid of tube 16 to become positive. This causes the current through tube 16 to increase, driving the plate voltage down. The voltage on lead 18, which is the plate voltage of tube 16, has thus been lowered.

The current through tube 17 will remain essentially constant, so the voltage on lead 19 will remain essentially constant. By decreasing the voltage on lead 18, the voltage on grid 30 is decreased with respect to grid 31, making grid 31 positive with respect to grid 30.

In the balanced bridge cathode follower stage the two cathode resistors 33 and 34 are equal resistors. If the grids 30 and 31 are at the same voltage then the currents through resistors 33 and 34 should be equal, and there will be no difference in voltage between lead 22 and 21, and no input current to the mag. amp. If, however, grid 31 is positive with respect to grid 30 (resulting from a positive input signal on lead 12) then the current through resistor 34 is greater than that through resistor 33. Lead 21 is then positive with respect to lead 22 and there is an input current to the mag. amp.

Similarly, if grid 30 is positive with respect to grid 31 (resulting from a negative input signal on lead 12) then the current through resistor 33 is greater than that through resistor 34. This makes lead 22 positive with respect to lead 21 and there is an input current to the mag. amp. again. The output voltage of the mag. amp. appearing on lead 13 is negative with respect to lead 14 when lead 21 is positive with respect to lead 22, and the output voltage is positive when lead 21 is negative with respect to lead 22. Thus, a positive input signal on lead 12 produces a negative mag. amp. output, and a negative input signal produces a positive mag. amp. output. When the shorting switch 27 is closed there is no input signal so there should be no mag. amp. output. However, due to slight differences in tubes and supposedly equal resistances, there may be a small voltage on lead 19 with respect to 18, and/or a small voltage on lead 22 with respect to 21 and/or a null voltage on the mag. amp. output, which causes a current to flow through the meter 15 when the switch 27 is closed. The zeroing potentiometer 26 is then used to change the voltage on the grid of tube 17 until the unbalance condition is overcome and the current meter reads zero. As mentioned previously, this zero adjustment generally has to be made only once after the tubes have been aged for there is substantially no drift of the zero point after proper tube aging.

There are methods of zeroing, other than the particular method disclosed, which could be used with this instrument. While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A D.C. linear micromicroammeter comprising a D.C. amplifier having an input lead, a common lead, and an output lead, said amplifier including a balanced bridge electrometer tube input stage connected to said input lead, a balanced bridge cathode-follower stage connected to the output of said electrometer tube input stage, and a magnetic amplifier stage connected to the output of said balanced bridge cathode-follower stage, said output lead of said D.C. amplifier issuing from the output of said magnetic amplifier stage, said common lead of said D.C. amplifier being connected to all of said stages, a D.C. current indicator having a first and second terminal with said first terminal connected to said output lead and said second terminal connected to electrical circuits leading to said input lead and said common lead, a high impedance resistor connected between said input lead and said second terminal of said current indicator, a low impedance resistor connected between said second terminal of said current indicator and said common lead, said input lead and said common lead of said D.C. amplifier being input leads for said micromicroammeter, said D.C. amplifier providing a voltage on said output lead that is opposite in polarity with respect to a voltage applied to said input lead whereby very small D.C. currents may be accurately measured over a considerable current range regardless of nonlinearities that may exist in said D.C. amplifier.

2. A D.C. linear micromicroammeter comprising a D.C. amplifier having an input lead, a common lead, and an output lead, said amplifier including a balanced bridge electrometer tube input stage connected to said input lead, a balanced bridge cathode-follower stage connected to the output of said electrometer tube input stage, and a push pull magnetic amplifier stage connected to the output of said balanced bridge cathode-follower stage, said output lead of said D.C. amplifier issuing from the output of said magnetic amplifier stage, said common lead of said D.C. amplifier being connected to all of said stages, a D.C. current indicator capable of measuring D.C. currents of opposite polarities, said current indicator having a first and second terminal with said first terminal connected to said output lead and said second terminal connected to electrical circuits leading to said input lead and said common lead, a variable high impedance resistor connected between said input lead and said second terminal of said current indicator, a variable low impedance resistor connected between said second terminal of said current indicator and said common lead, and said input lead and said common lead of said D.C. amplifier being input leads for said micromicroammeter whereby very small D.C. currents may be measured with the use of a current indicator of only ordinary sensitivity.

References Cited in the file of this patent

UNITED STATES PATENTS

| | | |
|---|---|---|
| Re. 24,068 | Geyger | Oct. 4, 1955 |
| 2,618,751 | Fearnside et al. | Nov. 18, 1952 |
| 2,637,786 | Bordewieck | May 5, 1953 |
| 2,731,519 | Bordewieck | Jan. 17, 1956 |

OTHER REFERENCES

Valley-Wallman: Vacuum Tube Amplifier, Rad. Lab. Series No. 18, 1st ed., page 490. McGraw-Hill, N.Y.C., 1948.